US008645775B2

(12) United States Patent
Dressler et al.

(10) Patent No.: US 8,645,775 B2
(45) Date of Patent: Feb. 4, 2014

(54) METHOD AND APPARATUS FOR THE DETERMINATION OF A REPETITIVE BIT VALUE PATTERN

(75) Inventors: Jens Dressler, Stuttgart (DE); Jens Sundermann, Boeblingen (DE)

(73) Assignee: Advantest (Singapore) Pte Ltd, Singapore (SG)

( * ) Notice: Subject to any disclaimer, the term of this patent is extended or adjusted under 35 U.S.C. 154(b) by 432 days.

(21) Appl. No.: 12/994,069

(22) PCT Filed: May 21, 2008

(86) PCT No.: PCT/EP2008/004092
§ 371 (c)(1),
(2), (4) Date: Mar. 1, 2011

(87) PCT Pub. No.: WO2009/140981
PCT Pub. Date: Nov. 26, 2009

(65) Prior Publication Data
US 2011/0145654 A1    Jun. 16, 2011

(51) Int. Cl.
*G11C 29/00*    (2006.01)

(52) U.S. Cl.
USPC .............. 714/720; 714/39; 708/252; 354/692

(58) Field of Classification Search
USPC ..................... 714/39, 720; 708/252; 354/692; 327/159; 331/10
See application file for complete search history.

(56) References Cited

U.S. PATENT DOCUMENTS 3,731,210 A * 5/1973 Mollod .......................... 327/159
6,151,001 A * 11/2000 Anderson et al. ............... 345/63
2005/0278402 A1 * 12/2005 Ishikawa ........................ 708/250
2009/0070658 A1 * 3/2009 Patapoutian et al. ......... 714/795
2010/0262617 A1 * 10/2010 Shinjo et al. .................. 707/769

FOREIGN PATENT DOCUMENTS

EP    0149048 A    7/1985

OTHER PUBLICATIONS

Hilliges, Klaus-Dieter, et al., "A True Testprocessor-Per-Pin Algorithmic Pattern Generator, Memory Technology, Design and Testing", 1996. Records of the 1996 IEEE Workshop, Piscataway, NJ, USA, Aug. 13, 1996, pp. 103-109.
Hilliges, K., et al., "A True Testprocessor-Per-Pin Algorithmic Pattern Generator", IEEE International Workshop on Memory Technology, Design and Testing, Piscataway, New Jersey, 1996, 7 pages.
Cha, C.W., et al., "Array Test Pattern Generation Algorithms for a Per Pin Tester", IP.com Journal, IP.com, Inc., West Henrietta, New York, 1988, 8 pages.

* cited by examiner

*Primary Examiner* — Guy Lamarre

(57) ABSTRACT

A repetitive bit value pattern associated to a predetermined bit position of a sequence of data words, the data words having two or more bits in a bit order, a bit position describing a position within the bit order being indicative of a value represented by the bit at the bit position, can be determined from program loop information, the program loop information having a program expression for determining an updated data word of the sequence of data words. Using the predetermined bit position, a sequence length value associated to the predetermined bit position is determined. The program expression is evaluated for a number of loop iterations indicated by the sequence length value, to obtain updated bit values associated to the predetermined bit position. The repetitive bit value pattern is determined using the updated bit values of the number of loop iterations.

20 Claims, 4 Drawing Sheets

| x | x[3] | x[2] | x[1] | x[0] |
|---|---|---|---|---|
| 0 | 0 | 0 | 0 | 0 |
| 7 | 0 | 1 | 1 | 1 |
| 14 | 1 | 1 | 1 | 0 |
| 21 | 0 | 1 | 0 | 1 |
| 28 | 1 | 1 | 0 | 0 |
| 35 | 0 | 0 | 1 | 1 |
| 42 | 1 | 0 | 1 | 0 |
| 49 | 0 | 0 | 0 | 1 |
| 56 | 1 | 0 | 0 | 0 |
| 63 | 1 | 1 | 1 | 1 |
| 70 | 0 | 1 | 1 | 0 |
| 77 | 1 | 1 | 0 | 1 |
| 84 | 0 | 1 | 0 | 0 |
| 91 | 1 | 0 | 1 | 1 |
| 98 | 0 | 0 | 1 | 0 |
| 105 | 1 | 0 | 0 | 1 |
| 112 | 0 | 0 | 0 | 0 |
| 119 | 0 | 1 | 1 | 1 |
| 126 | 1 | 1 | 1 | 0 |

METHOD AND APPARATUS FOR THE DETERMINATION OF A REPETITIVE BIT VALUE PATTERN

BACKGROUND OF THE INVENTION

The present invention relates to a method and to an apparatus for the determination of a repetitive bit value pattern and, in particular, to a concept for determining repetitive bit value patterns for bits at predetermined positions within a sequence of data words which are generated by program expressions or operations performed on the data words, the program expressions or operations changing or updating the content of a plurality of bits of the data word.

The necessity of deriving a repetitive bit value pattern for particular bits of data words which are caused by operations or high-level programming languages operating on the data words may arise in a wide field of applications. This may, for example, be desirable to store the results of expressions of a high-level programming language, such as, for example, C or C++, in a efficient manner. If, for example, a program loop is evaluated, it might be possible that the second bit of an 8-bit data word is a constant or alters in a repetitive pattern. The bit may change its value repeatedly from 0 to 1. In terms of storage efficiency, it may be appropriate to store the resulting bit sequences of the loop separately for each bit of the data word, such that for the exemplary second bit, the complete result could be stored in an algorithmic manner indicating that the bit sequence "01" shall be repeated a predetermined number of times.

An alternate application may be testing electrical devices, such as, for example, memory devices. The high speed of the presently available electrical equipment or memory may necessitate processing each individual data terminal of the devices independently from the remaining data terminals in order to test with the maximum bandwidth of the device. This is, for example, the case when state of the art memory devices are to be tested, which do comprise a high number of data terminals. When each data terminal is connected to an individual test pin of a memory tester or a test system, each test pin having its own program logic, there exists the necessity of deriving the bit patterns occurring at each individual test pin. With increasing test program complexity, it may be highly desirable to determine a repetitive bit value pattern associated to a predetermined test or data pin, such that the repetitive bit value pattern only has to be stored once, associated by an algorithmic description indicating the number of repetitions necessitated in the course of the program.

Previous approaches to determine the repetitive bit value pattern as, for example, the one described in the IEEE Publication entitled "A True Test Processor Per-Pin Algorithmic Pattern Generator", Klaus-Dieter Hilliges and Jens Sundermann, 1996, propose to evaluate all expressions of a program first in order to search for a repetitiveness in the resulting bitstream generated by the program. However, this necessitates computing the complete program prior to the extraction of a possibly repeating bit sequence, which is very time and resource consuming.

Moreover, following this approach, there is no constraint regarding the length of a possibly repetitive bit value pattern. Therefore, also the search for a repetitive bit value pattern in the bitstream generated by completely processing the program is extremely time-consuming, since arbitrary bit pattern lengths have to be considered.

Further approaches try to organize the evaluated bitstream within specialized data structures, such as to determine a repetitive bit value pattern by performing certain symmetry operations on those data structures. This approach is, for example, followed by the previously cited document. However, the application of the symmetry operations necessitates plenty of resources, such that a real-time processing is, as well as for the other conventional attempts, not feasible.

SUMMARY

According to an embodiment, a method for determining a repetitive bit value pattern associated to a predetermined bit position of a sequence of data words, the data words having two or more bits in a bit order, a bit position describing a position within the bit order being indicative of a value represented by the bit at the bit position, based on a program loop information, the program loop information having a program expression for determining an updated data word of the sequence of data words, and iteration information derived from the program loop information, the iteration information indicating a number of loop iterations to be performed for generating the sequence of data words, may have the steps of: determining, using the predetermined bit position, a sequence length value associated to the predetermined bit position based on a polynomial expression without performing all loop iterations; after determining the sequence length value, evaluating the program expression only for the number of loop iterations indicated by the sequence length value, to obtain updated bit values associated to the predetermined bit position; and using the updated bit values of the number of loop iterations to determine the repetitive bit value pattern.

According to another embodiment, a bit value pattern analyzer adapted to determine a repetitive bit value pattern associated to a predetermined bit position of a sequence of data words, the data words having two or more bits in a bit order, the bit position describing a position within the bit order being indicative of a value represented by the bit at the bit position, based on a program loop information, the program loop information having a program expression for determining an updated data word of the sequence of data words, and iteration information derived from the program loop information, the iteration information indicating a number of loop iterations to be performed for generating the sequence of data words, may have: a sequence estimator, adapted to determine, using the predetermined bit position, a sequence length value associated to the predetermined bit position based on a polynomial expression without performing all loop iterations; an expression evaluator adapted to evaluate the program expression for only the number of loop iterations indicated by the previously determined sequence length value, to obtain updated bit values associated to the predetermined bit position; and a bit value pattern generator adapted to use the updated bit values of the number of loop iterations to determine the repetitive bit value pattern.

Another embodiment may have a computer program adapted to, when running on a computer, implement any of the inventive methods.

According to another embodiment, a test system for testing devices having two or more data terminals configured to receive a sequence of data words, the data words having two or more bits in a bit order, a bit position describing a position within the bit order being indicative of a value represented by the bit at the bit position, the test system having a first and a second data pin configured to be coupled to the first and second data terminals of the device, may have: a bit value pattern analyzer adapted to determine a repetitive bit value pattern associated to a predetermined data pin, based on a program loop information, the program loop information having a program expression for determining an updated data word of the sequence of data words, and iteration information derived from the program loop information, the iteration information indicating a number of loop iterations to be performed for generating the sequence of data words, the bit value pattern analyzer having: a sequence estimator, adapted to determine, using the predetermined bit position associated to the predetermined data pin, a sequence length value associated to the predetermined data pin based on a polynomial expression without performing all loop iterations; an expression evaluator adapted to evaluate the program expression for only for the number of loop iterations indicated by the previously determined sequence length, to obtain updated bit values associated to the predetermined data pin; and a bit value pattern generator for generating the repetitive bit value pattern for the predetermined data pin using the updated bit values of the number of loop iterations.

According to several embodiments of the present invention, a repetitive bit value pattern may be highly efficiently determined for a predetermined bit position within a data word in that a sequence length value, which is associated to the predetermined bit position, is calculated before the evaluation of the program expressions within the program. The sequence length value has information on the maximum repetition length of a bit value pattern occurring at the bit position in question.

According to some embodiments, the sequence length value is an upper limit in that it is the maximum length of a repetitive bit value pattern that may occur at the respective bit position. According to further embodiments, the sequence length value is not only an upper limit, but predicts precisely the length of the occurring repetitive bit value pattern.

When, at least, being aware of an upper limit indicated by a sequence length value, the program expressions to determine the repetitive bit value pattern only have to be evaluated the number of times indicated by the sequence length value. That is, in the determination of repetitive bit value patterns, the evaluations only have to be performed a limited number of times. This leads to a strong decrease in computational power necessitated for the determination of the repetitive bit value pattern.

In other words, the repetitive bit value pattern may be generated by evaluating the program expressions altering the bit values only for the number of loop iterations indicated by the sequence length value in order to obtain the updated bit values associated to the predetermined bit position.

According to further embodiments, the data words having the particular bit position of interest are accessed and altered several times within one loop iteration. In those embodiments, each expression within a loop iteration may be evaluated as often as indicated by the sequence length value in order to determine the repetitive bit value pattern. This may consist of the concatenation of the updated bit values as determined within each iteration.

When the repetitive bit pattern is determined, the bit value pattern resulting from the analyzed loop information or an expression may be stored or transmitted in an efficient manner. For example, the program language (high-level program language) may be transformed into a lower-level description (a Repeat Language representation or a Repeat representation) comprising the repetitive bit value patterns and additional instructions indicating the number of repetitions for the particular repetitive bit value pattern.

According to several embodiments of the present invention, the repetitive bit value patterns to be applied to particular test or data pins of a test system are determined based on a high-level program expression, affecting multiple data pins in parallel. Access-schedules to memory devices, chips or modules are often defined using a high-level programming language. The bit sequences or bit value patterns necessitated to control the memory devices may then be described in terms of repetitive bit value patterns and associated information indicating the number of repetitions of each repetitive bit value pattern.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments of the present invention are described, which determine repetitive bit value patterns for predetermined bit positions within a data word or sequences of data words analyzing a high-level memory test language for testing memory chips, modules or devices connected to multiple test pins of a test system. It is assumed that each data terminal of the memory devices is connected with one particular test pin (data pin). To this end, the description of the inventive concept is performed within one of various possible application scenarios, i.e. focusing on the testing of memory devices. However, as already indicated above, further embodiments of the invention may also be used to derive or to determine repetitive bit value patterns as generated by other standard-programming languages, such as, for example, C, C++, Fortran, modula 2, Perl, Phyton, Basic, visual basic, java, java script or other high-level programming languages.

Figure 1:
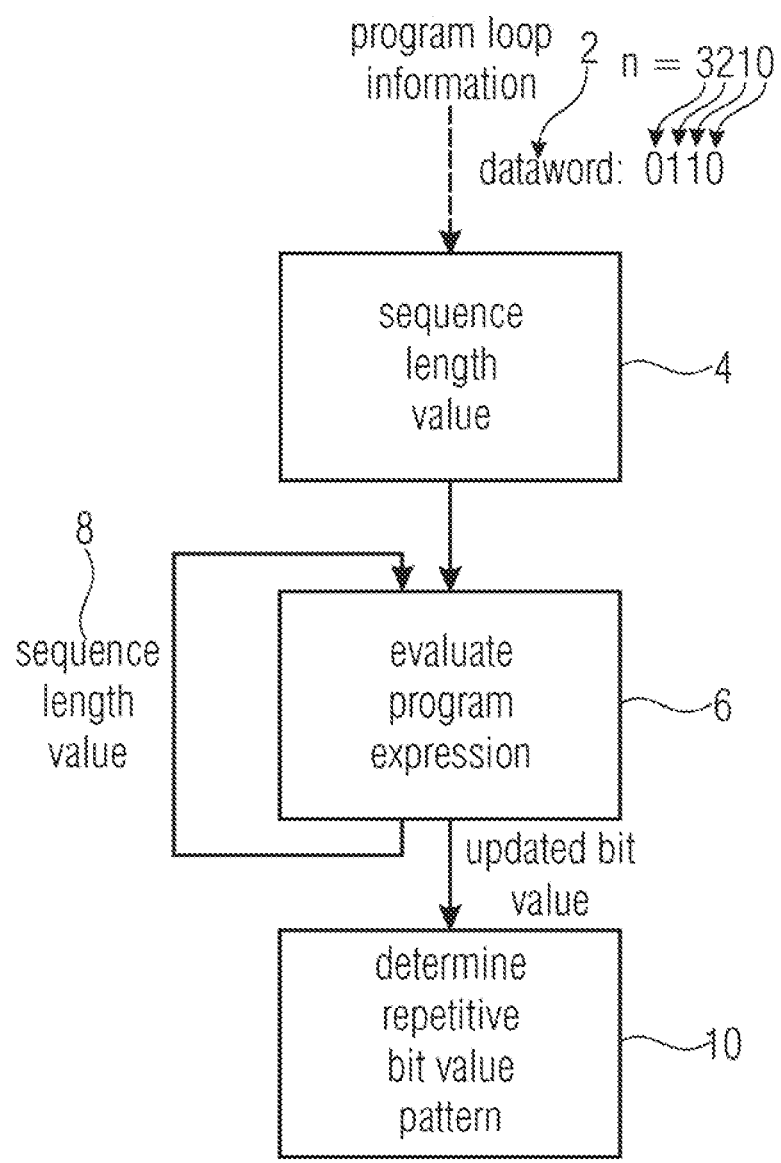
FIG. 1 is a flow chart for a method for determining a repetitive bit value pattern.

FIG. 1 shows a block diagram illustrating a method for determining a repetitive bit value pattern associated with a predetermined bit position of a sequence of data words, the data words comprising two more bits in a bit order, a bit position describing a position within the bit order being indicative of a value represented by the bit at the bit position based on program loop information, the program loop information comprising a program expression for determining an updated data word of the sequence of data words.

That is, program expressions operate on the exemplary data word 2 to generate a sequence of data words. The data word comprises, in this particular example, only four bits at bit positions n, ranging from 0 to 3. In this particular example, the standard binary representation is chosen. However, according to further embodiments, other bases may also be used together with the inventive concept.

The repetitive bit value pattern associated with a predetermined bit position as, for example, with bit position n=0, may be determined as follows.

Based on the loop information, which could, for example, comprise information as to how often an expression affecting the data word 2 is to be evaluated, a sequence length value 8 associated with the predetermined bit position (n=0 in this particular example) is determined. This is performed in a determination step 4.

In an evaluation step 6, the program expression is evaluated for a number of loop iterations indicated by the sequence length value 8.

As explained in more detail below, for expressions satisfying particular conditions, the number of bits forming a repetitive bit value pattern due to one single expression is, at maximum, $2^{n+1}$ for a bit at bit position n. That is, if the program expression comprises only one statement altering the data word or the bit at bit position n=0, the program expression is to be evaluated only twice, wherein in each evaluation, updated bit values associated with the predetermined bit position are determined.

In a composition step 10, the updated bit values of the number of loop iterations are used to determine the repetitive bit value pattern.

Summarizing the above example with a sequence length value of 2, an expression within a loop is only evaluated twice. That is, if, for example, a loop has 100 iterations, the time-consuming evaluation of the loop for 100 times may be reduced for evaluating the expression only twice, since this is the maximum length of a repetitive bit value pattern, which can be caused by one single expression within the loop at the predetermined bit position (n=0). Therefore, the bit pattern resulting from the complete loop may be described as 25 times a repetition of the bit values derived in the first and the second evaluation of the expression of the loop. This simple example already shows the enormous potential for decreasing the computation complexity in the determination of repetitive bit value patterns and the increased efficiency in describing or storing the respective bit pattern output for the bit position of interest.

Figure 2:
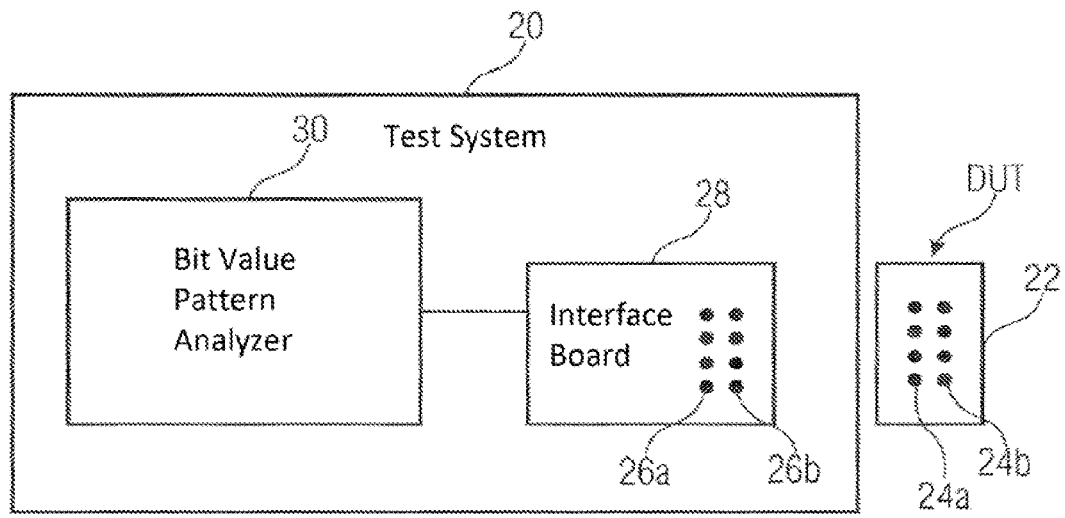
FIG. 2 is a test system for testing devices.

FIG. 2 shows an example of a test system 20 for testing devices as, for example, the device under test 22. The device has two or more data terminals as, for example, data terminals 24a and 24b. The test system has a plurality of data pins as, for example, data pins 26a and 26b, which are configured to be coupled to the two or more data terminals of the device under test 22. To this end, the data pins may be hosted by a specific interface board 28, being part of the test system 20 comprising the data pins. In order to enhance the flexibility, further embodiments of inventive test systems may comprise interchangeable interface boards 28 in order to be connected to different devices under test.

The data terminals 24a and 24b of the device under test 22 are configured to receive a data word comprising two or more bits in a bit order, wherein a bit position within the bit order is indicative of a value represented by the bit at the bit position. That is, for example, the data pin 24a may be configured to receive bit 0 of an address data word, whereas the data pin 24b may be configured to receive bit 1 of the respective address.

In order to determine the repetitive bit value patterns for the data pins 26a and 26b, the test system 20 further comprises a bit value pattern analyzer 30 adapted to determine the repetitive bit value pattern for a predetermined bit or a predetermined bit position.

The test system 20 may be used to test memory chips or memory devices, wherein the test algorithm and the test programs to be performed may be developed in a memory test language (MTL), which provides great flexibility and ease of use for defining all variations of traditional and complex memory patterns supporting any n-bit device transaction/command/packet/frame. To this end, the memory test language may be characterized in being a high-level algorithmic pattern description language to define test patterns to be applied to the multiple data terminals of the device under test 22, that is, to the memory device.

As an example, the V93000 HSM series of Verigy testers may be used to test memory devices as the test processor per-pin algorithmic pattern generator architecture provides the flexibility, scalability and accuracy for testing high-speed memory devices in memory core as well as in memory interface tests.

The V93000 HSM series further provides a low-level test processor language used to define the bit sequences for each data pin (test pin), which is operated without interchanging data with the other test pins, however, of course, in synchronization with said pins. The advantages of the per-pin architecture as compared to traditional shared resource architectures are, for example:

No limitations of the address width or the data width as any channel-resource (test pin 26a or 26b) can be used as a I,O or I/O pin for clock, address and data signals.

At speed testing without the need for APG multiplexing, that is, without the need for distributing the instructions affecting the multiple bits on a common data bus.

Usable for any memory access mode supporting any N-bit protocol.

To specify the bit operations for each pin, the V93000 HSM series provides a repeat language having only a limited number of language elements as elaborated in more detail below.

Figure 3:
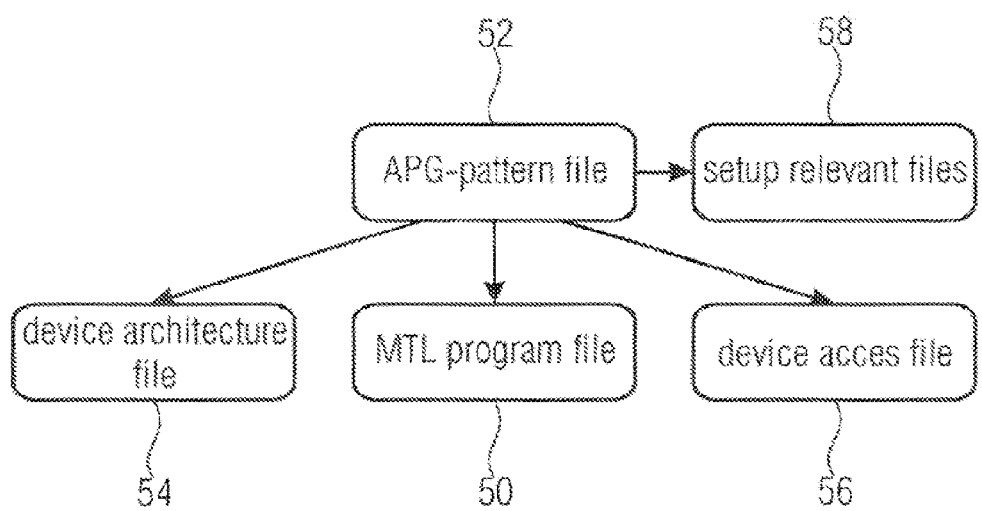
FIG. 3 is a high-level program scheme.

Owing to the great flexibility of the MTL language and the per-pin architecture, an MTL set-up consists of different set-up components, as indicated in FIG. 3.

The most important one is the MTL program file 50 itself, containing the program expressions defining the operations performed on the memory devices or modules. Further set-up components, which contain the memory pattern description, memory device related information and other set-up relevant information, like waveform and pin-mapping tables are necessitated in order to map the high-level parallel expressions and operations to the bit-patterns of the individual bits associated with the data pins of the test system.

Major files are the APG-pattern file 52, the device architecture file 54, the device access file 56 containing the device access definitions and, as already mentioned, the MTL program file 50 itself, which contains the algorithmic pattern description using routine calls, loops, variables and arithmetics as well as device access calls. Further auxiliary information may be contained within a further setup relevant file 58.

The memory test language MTL comprises various syntax elements and structures, similar to the expressions also used in other high-level programming languages.

In particular, every MTL program which defines a memory pattern has to have a routine called main( ). In general MTL routines do not have a return value. The main( ) routine describes the algorithmic pin-parallel memory pattern using a device centric view. The Test processor Per-Pin APG architecture is transparent to the user. The user can define traditional or complex memory patterns using a combination of loops, subroutine- or device access-calls and the highly flexible expression engine. Loop-counters normally specify memory addresses and can be used in combination with arithmetic- and bitwise-operators to define a wide variety of address-stepping- and data-sequences.

Furthermore, MTL allows the definition of subroutines, thus providing a mechanism for grouping related data and device access calls or other subroutines calls for organizing the memory pattern description into reusable parts or functions (subroutines). The following program example comprises a main loop as well as several subroutines, using some of the previously introduced syntax elements, as for example loop statements and subroutine calls.

```
main( )
{
   WriteBackground(data);
}
// Write Background subroutine - fast row stepping
WriteBackground(data)
{
   for (bank = bankStart; bank < bankStop; bank++)
   {
     for (row = rowStart; row < rowStop; row++) {
         Activate(row, bank);
         Idle(tRCD);
         // WRITE burst with write preamble
         Write_Preamb( );
         for (col = colStart; col < colStop; col += BurstLength)
         {
             Write(row, col, bank, data);
         }
         Idle(tWR);
         Precharge(bank);
         Idle(tRP);
     }
   }
}
// Activate subroutine
Activate(row, bank);
{
   // Device Access Calls
   CLK( );   CTRL(1,1);   ACT(row, bank);     DBUS_IDLE( );
}
# ACT - Bank Activate
:apgAccess:
{
   :name:    ACT
   :interface: { row bank }
   :table:
   {
       :format:
       {  :pin:              :states:        :data:
          {  CKE              {  0  1  }   1                            }
          {  ""               {  0  1  }   1                            }
          {  CSn              {  0  1  }   0                            }
          {  ""               {  0  1  }   1                            }
          {  RASn             {  0  1  }   0                            }
          {  ""               {  0  1  }   1                            }
          {  CASn             {  0  1  }   1                            }
          {  ""               {  0  1  }   1                            }
          {  WEn              {  0  1  }   1                            }
          {  ""               {  0  1  }   1                            }
          {  Bank.ACT.Bank    {  0  1  }   zaddr(bank)                  }
          {  ""               {  0  1  }   zaddr(ALL_ONES_BANK)         }
          {  Address.ACT.Row  {  0  1  }   xaddr(row)                   }
          {  ""               {  0  1  }   xaddr(ALL_ONES_ADDR)         }
       }
   }
}
```

The MTL language serving as one particular basis for the determination of the repetitive bit value pattern comprises numerous syntax elements, allowing bit wise operations or the creation of expressions operating on data words having two or more bits, such operating on data entities formed by two or more bits in a predetermined order. Some of the available syntax elements are shortly introduced below.

MTL provides a wide variety of arithmetic and bitwise operators that may be performed on loop-variables or non-loop-variables. MTL differentiates between three different types of variables: Global constant variables defined in the APG-Pattern File or Device Architecture File, local static variables and loop variables defined in the MTL program file. Local static variables fall in two categories: Induction variables and loop-invariant variables. Induction variables get increased or decreased by a fixed amount on every loop iteration, or are a linear function of another induction variable. All operators that can be used with all types of variables are shown in the following table.

| Operators | Description |
|---|---|
| + | Add |
| − | substract |
| * | Multiply |
| / | Division |
| ^ | bitwise xor |
| & | bitwise and |
| \| | bitwise or |
| ~ | bitwise not |
| << | shift left |
| >> | shift right |
| ++ | increment |
| -- | decrement |

Operators that can be used with local static variables are shown in the subsequent table. If these operators are used on local-static variables inside loops, said variables become induction variables.

| Operators | Description |
| --- | --- |
| += | left = left + term( ) |
| −= | left = left − term( ) |
| *= | left = left * term( ) |
| /= | left = left / term( ) |
| ^= | left = left ^ term( ) |
| &= | left = left & term( ) |
| \|= | left = left \| term( ) |
| <<= | left = left << term( ) |
| >>= | left = left >> term( ) |

One example code using the previously introduced syntax elements is given below:

```
main( )
{
    static_variable = 2;
    induction_variable = 0;
    for (x = xStart; x < xStop; x++)
    {
        // Induction Variables get increased in each loop-iteration
        induction_variable += 2;
        // Expression can contain different types of variables
        access_call(induction_variable + (x << 3));
        access_call(static_variable * x + induction_variable +
CONSTANT_VARIABLE);
    }
}
```

Note that in the previous example, either access call within the for-loop may trigger the access to a particular column or row of a memory array under test. As the accessed address would in this scenario depend on the loop variable and/on the induction variable, the bits at the associated column-/or row-address terminals of the device under test would be altered. That is, the bits of the data word accessed or altered by the access call instructions could change.

The bit change does, furthermore, occur numerous times, as long as the loop condition is satisfied. Implementing the inventive concept, the repetitive bit value pattern created by the above statements may be derived by determining a sequence length value, indicating the sequence length of the repetitive bit value pattern for one selected bit of the data word storing the address accessed by the respective access calls. Once the sequence length value is known, the resulting repetitive bit value pattern may be derived by evaluating the expressions within the loops only the number of times indicated by the repetitive bit value pattern. That is, the bit value resulting pattern is the same as if the loop was processed the number of times indicated by the loop condition. The number of times the loop is to be iterated is given by the iteration information contained within the loop information (being for example the information contained within the statements following the for-statement).

If, for example, only the repetitive bit value pattern of bit at position n=0 is of interest, the expressions within the for-loop have to be evaluated only.

In other words, one particularly attractive application of the inventive concept is the determination of repetitive bit value patterns produced by loop statements within a high-level program language, such as MTL.

MTL provides a way of defining regular loops using a for statement:

for (init-statement; end-condition; increment) {statements}

The for-loop increment can be any positive or negative number and may not be dependent on another loop- or induction-variable.

One further example using numerous nested for-loop to access all memory cells within a memory device is given below.

```
main( )
{
    for (bank = bankStart; bank < bankStop; bank++)
    {
        for (col = colStart; col < colStop; col += BurstLength)
        {
            for (row = rowStart; row < rowStop; row++)
            {
                Activate(row, bank);
                Idle(tRCD);
                Read(row, col, bank, data);
                // Read to Write latency:
                Idle(CL + tCCD + 2 − CWL −5);
                // WRITE burst with inverted data
                Write_Preamb( );
                Write(row, col, bank, ~data);
                Idle(tWR);
                Precharge(bank);
                Idle(tRP);
            }
        }
    }
}
```

In typical memory tests scenarios, single pins, as for example the pins associated to or connected with address lines of the device under test, show a high level of repeatability. That is, those pins often show a bit value pattern consisting of one particular repetitive bit value pattern which is repeated numerous times. As already previously mentioned, one challenge when determining such repetitive bit value patterns is the determination of the repetitiveness, i.e., the length of the repetitive bit value pattern, when the associated data word (vector) depends on a bit-expression or on a program expression, containing loop-variables or induction variables (e.g., loop counters for addresses).

Figure 4:
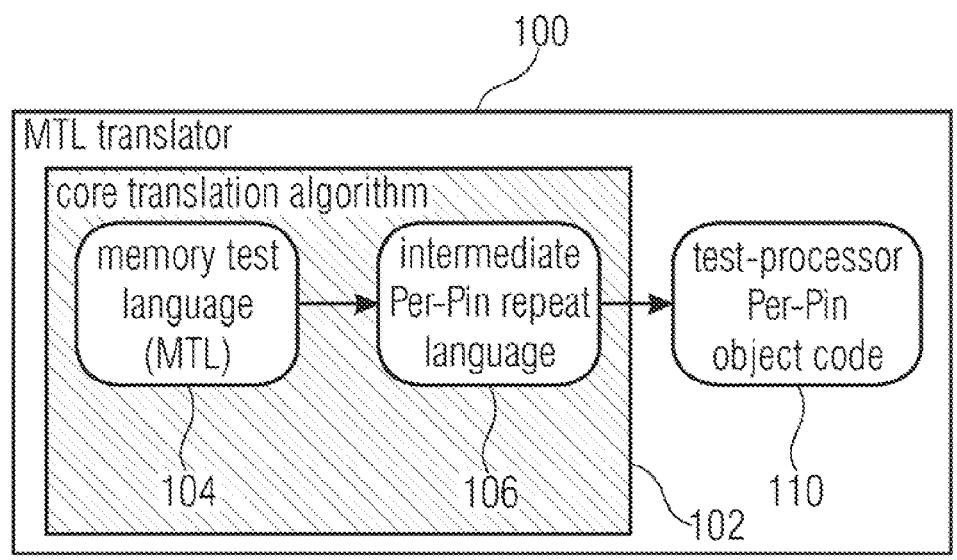
FIG. 4 is a block diagram describing a scheme to determine a repetitive bit value pattern from a high-level program language.

In the above test setup, using for example test system 20, a MTL translation may be used, implementing a method for determining a repetitive bit value pattern associated to a predetermined bit position of a sequence of data words, as for example indicated in FIG. 4. The MTL translator 100 may comprise a core translator 102 implementing the method for determining the repetitive bit value pattern, in order to transform the MTL program code 104 into a repeat language representation 106, comprising the repetitive bit value pattern and associated information, indicating, for example, the number of times, the repetitive bit value pattern is repeated at a particular pin or at a particular bit position.

The MTL core translator provides a method to calculate the repeating bit sequence length (sequence length value) based on a polynomial expression ahead of time, i.e., without performing all loop iterations. The repeating bit sequence length (the sequence length value) indicates the maximum number of evaluations, necessitated for creating the repeating bit-sequence (the repetitive bit value pattern) for a pin or a bit position, wherein the loop-init statement, the loop-condition and the loop-increment are taken into account. The so-derived repeating bit-sequence (the repetitive bit value pattern) may optionally be converted to a binary loop split up tree (LST). The loop split up tree visualizes a limited number of syntax elements of the repeat language in order to visualize the result of the memory test language evaluation in the repeat language, thus also defining a conversion rule on how the for-loop is mapped to the repeat language of the test processor associated to a data pin of the test system.

When the representation of the program in the repeat language for each individual pin or test pin has been created, test processor object code 110 may additionally be created, in order be loaded into the test processor, which is associated to each test pin. This provides the information necessitated to enable the test processor to perform operation. However, in alternate embodiments, the test processor may also be operative to execute the repeat language representation directly.

Figure 5:
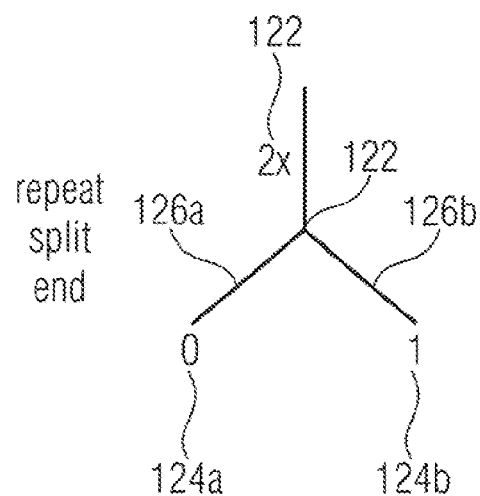
FIG. 5 is a visualization of syntax elements describing a bit value pattern in a repeat language.

FIG. 5 illustrates the visualizing elements of a loop split-up tree, defining the rule on how a for-loop can be converted to a nested repeat statement. A loop split-up tree consists of three main elements, namely repeat-nodes 120, split-nodes 122 and end nodes 124a and 124b. A repeat node has a single child, which could be any of the three elements previously defined, but may not be empty. The repeat node 122 represents a repeat of all following nodes of the tree, that is all following nodes are executed twice. A split-node has two children, which are referred to as left child 126a and as right child 126b. Both children define a sequence of nodes starting with the left child node 126a. They need to have the same number of levels and could be any of the three nodes but, again, may not me empty. The end nodes 124a and 124b are leaf nodes having no children. The value of an end-node in binary notation can be either "0" or "1".

As the maximum number of repetitions indicated by a syntax element is 2, additional repeat nodes are added in order to cover all iterations of a loop represented by the loop split-up tree, when the respective loop has more than two iterations.

In summarizing, an MTL translator 100 used in the previously described memory testing setup may perform the following steps, while converting a high-level pin-parallel description into a per-pin APG program:

For each data pin reduce the algorithmic memory pattern description to all device-access calls which are relevant for this pin.

Resolve variables and evaluate all constant expressions. Constant expressions of device-access definitions that are defined outside of loops can be directly converted to a vector representing the bits of this device access.

If a constant expression is assigned to a pin inside loops, the MTL Translator maps the bit, which corresponds to the defined pin directly into the Repeat Language. If an expression that is assigned to a pin depends on a loop variable or induction variable the repetitiveness of the particular bit of the expression responsible for the pin's vector data has to be determined. In case the expression result is passed as an argument to a data- or address-scrambling macro the bitwise Boolean scramble expression that one can define has to be taken into account. After creating a repeating sequence that represents a particular bit covering the whole loop range, the MTL Translator converts this sequence to a Binary Loop Split-up Tree (LST).

Convert all for-loops based on the LST and the smallest possible bit-sequence to the Repeat Language.

Translate the Repeat Language program into object code to be loaded into vector memory.

The MTL Translator may be optimized for performance and per-pin vector memory consumption. This approach can be applied to complex core and interface test patterns used in production test programs as well as for memory patterns used for device characterization.

The approach of determining a repetitive bit value pattern by means of evaluating associated program loops the number of times indicated by a sequence length value provides the flexibility needed to test present high speed memory device architectures without increasing compile times and vector memory consumption. Testing may be performed without having to wait an unacceptable period of time, before the execution of the test program can start at the test processors associated to each individual pin. In order to achieve this goal, the core translation algorithm of the MTL Translator calculates the repeating sequence length from the expression taking the loop-init-statement, the end-condition and the loop for the current pin, the Translator creates the repeating bit-sequences by evaluating the polynomial expressions that one can specify in the MTL Program File or Device Access Definition.

If a loop contains multiple accesses, the individual LSTs of each access are merged so that the resulting tree represents the smallest possible repeating bit-sequence for that loop. Nested for-loops are processed from the most outer to the most inner loop.

As previously defined, the repeating bit-sequence length depends on the particular bit a pin represents. The general equation for calculating the repeating bit-sequence length is $2^{(n+1)}$ for a polynomial function which satisfies:

$$f(x)=a_n x^n + a_{n-1} x^{n-1} + \ldots + a_2 x^2 + a_1 x + a_0,$$

where 'n' represents the particular bit.

The following example based on a data word having four bits in a bit order according to the standard binary representation details the application of the method for determining a repetitive bit value pattern. The evaluation shall be performed for the following loop statements, enclosing an access call to a memory address represented by the data word x:

```
for (x=0; x < 128; x+=7)
{
    access_call(x);
}
```

Figures 6, 7:
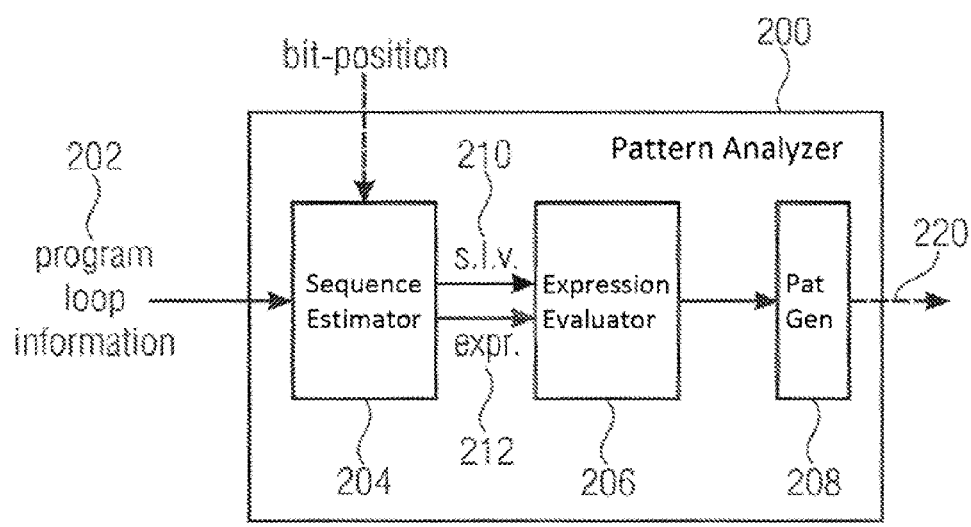
FIG. 6 is an example for repetitive bit value patterns generated by a program expression within a program loop.
FIG. 7 is an embodiment of a repetitive bit value pattern analyzer.

The loop-variable is passed as a parameter to an device access. The repeating sequence length for bit '0' of x is calculated as $2^{(0+1)}$ which is 2. The MTL Translator now evaluates the first 2 iterations of the loop and builds the repeating bit-sequence by looking at the result of bit '0' only. In the example the resulting repeating bit-sequence would be "01" for bit '0'. FIG. 6 shows the result of the evaluation of the complete for loop, such as the respective repetitive bit value patterns become visible for each of the four bits. As explained above, bit number 0 does have a sequence length of 2, as indicated by the sequence length value (the repeating sequence length). That is, to determine the repetitive bit value pattern for bit number 0, the for-loop has to be evaluated only twice, whereas the number of repetitions of the so-derived repetitive bit value pattern can be calculated in an algorithmic manner, evaluating the loop conditions.

The repetitive bit value patterns associated to the remaining bit positions are also shown in FIG. 6. In summarizing, these repetitive bit value patterns are:

x[0]: nx("01")
x[1]: nx("0110")
x[2]: nx("01111000")
x[3]: nx("0010101011010101")

In summarizing the application of the inventive concept to memory testing using presently available V93000HSM series tester, the APG Per-Pin architecture is necessitated for current and future High-Speed memory devices in order to achieve the performance and accuracy which is needed to test these devices at-speed. The Memory Test Language as part of the V93000 HSM Series provides the flexibility which is needed to define traditional as well as new Memory Test Patterns which become necessitated when testing High-Speed Memories. At the same time the language and MTL Translator support any n-bit device access mode which opens it up for a wide range of applications. The MTL Language and the MTL Translator is proven to be ready for the most advanced memory test requirements of today's and future non-volatile memory devices.

In the following, some further examples are given as to how to derive a repetitive bit value pattern based on the previously-introduced MTL description. This is just an example for a high-level program description having loop information, that is, comprising syntax elements causing a repetitive evaluation of the corresponding program expressions.

In general, a program code will have more than one single loop statement and comprise nested loop statements, i.e. loop statements occurring within other loop statements. The subsequently-given examples will be more complicated and, especially, comprise nested loop statements.

For-loops are recursively processed traversing from the root of the syntax tree down to the leaves of the tree. A translator implementing the method for determining a repetitive bit value pattern starts to convert the most outer for-loops first and then process the inner loops in case a for-loop is nested either as defined by the user or as a result of a for-loop conversion. In case of a split-up tree (LST) realization is chosen, the LST defines the conversion rule. However, the conversion may also be performed without building the LST as an intermediate representation. To this end, the LST is rather a visualization in order to better understand the underlying algorithm. While repeat and split nodes are important for the conversion subsequently described, the leaves of the LST just mark the end of the split-up tree without contributing to the resulting bit repetition pattern.

The following example will first shortly introduce the concept of processing nested for-loops, while the later examples will process the MTL program completely down to a representation of the bit value pattern comprising only repetitive bit value patterns and associated repeat statements.

Consider the following program listing as an example to be processed:

```
for (x=50;x>0;x-=9){   // defines abs((start−stop)/(step)) +1
                       // iterations => ((50−0)/−9) +1 = 6
   for (y=0;y<64;y+=3){
      (x+y)[0];        // sequence for 'x' up to the next power-of 2
                       boundary:
                       // 2x(2x(EL, ER))
      0;               // 'x' is NOT used here - ignore
      (x*x)[0];        // sequence for 'x' up to the next power-of 2
                       boundary:
                       // 2x(2x(EL, ER)) - no other loop variable
                       // involved, so a bit-value of just '0' or '1'
                       // is sufficient because no further processing
                       // is necessary here.
      (~y)[0];         // 'x' is NOT used here - ignore
   }
}
```

As previously defined, a translation algorithm implementing the method to determine the repetitive bit value pattern starts with the outer loop comprising "x" as loop variable, that is the processing is started with the loop 'for (x=50;x>0;x-=9) { . . . }'. In the following the repetitive bit value pattern of bit number "0" is determined, for the sake of simplicity. For higher order bits, the repetitive bit value pattern can be determined as easily, as will become apparent from the following discussion. When calculating the sequence length value for a bit number 0, equation $2^{(n+1)}$ is evaluated, thus resulting in a sequence length value of 2. That is, bit number 0 has a maximum length of 2 of a repetitive bit value pattern caused by a single expression. This is true as long as the previously defined prerequisite of:

$$f(x)=a_n x^n + a_{n-1} x^{n-1} + \ldots + a_2 x^2 + a_1 x + a_0,$$

is true, which is, for example, the case for binary, octal, decimal, hexadecimal and further representations of numbers. As it becomes apparent from the analyzation of the loop information of the outer loop, that is, the loop start, the loop step and the loop increment, the for-loop has six iterations. That is, a single statement could cause six changes of the bit value of bit at bit position 0. A straight-forward approach of transforming the result of the loop in the intermediate LST representation would be to substitute the for-loop by the following expression:

'$2 \times (2 \times (\text{End}_{Left}, \text{End}_{Right}))$'.

That is, once it is known that the sequence length value is 2, that is, a repeating bit value pattern is only 2 bits long, the end nodes ($N_{left}$ and $N_{right}$) would contain the respective repetitive bit value pattern, which is repeated eight times, as indicated by the subsequent use of the repetition operator. However, the loop has only six iterations, resulting in a bit value pattern of length 6. This is not directly describable with the limited syntax elements of the LST representation. Therefore, the representation has to be modified, as it will be detailed below.

In terms of an LST representation, the outer for-loop is converted in a recursive way to a repeat-loop using the LST. For each repeat-node (defined by '2×') it generates a repeat-instruction of the form "repeat the next instructions 2 times". For each split-node it creates a left- and a right-node simply duplicating all expressions contained in the body of the loop. For each end-node it generates an expression taking the loop-variable value of the corresponding iteration, the counting direction (decrementing vs. incrementing) and the location relative to a parent-node (e.g. left or right if parent is a split-node) into account. Then the Translator replaces the loop-variable with the resulting value in all expressions here it is used.

From the determination of the sequence length value, it is known that the repetitive bit value pattern has a length with an upper limit of 2. That is, an expression within the loop only has to be evaluated twice. For the further processing from the outer loop to the inner loop, the inner loop statement is straight-forwardly taken to be a single expression, which is to be evaluated only twice. Therefore, after the first transformation step, the program reads as follows:

```
repeat 2 {
   for (y=0;y<64;y+=3){
      (50+y)[0];
      0;
      0;
      (~y)[0];
   }
```

```
        for (y=0;y<64;y+=3){
            (41+y)[0];
            0;
            1;
            (~y)[0];
        }
    }
    for (y=0;y<64;y+=3){
        (14+y)[0];
        0;
        0;
        (~y)[0];
    }
    for (y=0;y<64;y+=3){
        (5+y)[0];
        0;
        1;
        (~y)[0];
    }
```

Considering the first 'repeat 2' statement, the processing from the outer for-loop to the inner for-loop becomes apparent. Regarding the outer loop having the loop variable x, only two evaluations are necessitated, as indicated by the sequence length value. As the for-statement is processed as any other "normal" expression, the for statement of the inner loop is only evaluated twice.

However, of course, the evaluation has to be performed using the appropriate value of the outer loop variable x. That is, the inner for-loop statement is evaluated twice, wherein the first evaluation uses a first value of x (x=50) and the second evaluation uses a second value of x (x=41): As only a number of repetitions by powers of two are directly accessible by nested 'repeat 2' statements, the inner for-loop has to be evaluated two more times outside of the first 'repeat 2' statement in order to fully describe the six evaluations of the outer for-loop of the original MTL program. To this end, the two additional evaluations are appended to the 'repeat 2' statement, again considering the correct value of loop variable x, that is, the first evaluation uses x=14 and the second evaluation uses x=5.

It is apparent from the previous example as to how nested for-loop statements are processed. The further examples contain an MTL program comprising nested for-loops, which are processed up to the very end, i.e. to a representation comprising only repetitive bit value patterns and associated repetition statements indicating the number of times the repetitive bit value pattern has to be repeated.

```
main( )
{
    for(x=0; x<50; x+=1)
    {
        access(x);
    }
}
Corresponding Syntax Tree:
for (x=0; x<50; x+=1)
{
    x[0]        // bit '0'
                // repeat "01" 25 times
                // repeat 25 {01}
}
Corresponding Loop Split-up Tree for bit '0' (LST):
2x(2x(2x(2x(2x((End_{Left},End_{Right}))))) = 32 × (End_{left}, End_{right})
Corresponding Repeat-Loop:
repeat 2 {
    repeat 2 {
        repeat 2 {
            repeat 2 {
                01
            }
        }
    }
}
repeat 2 {
    repeat 2 {
        repeat 2 {
            01
        }
    }
}
01
```

Starting from the simple previous example where a memory array is accessed at address x, it is known that the sequence length value is equal to 2 when being interested in a bit at the bit position "0". In order to derive the repetitive bit value pattern, the evaluation of the corresponding for-loop only has to take place twice. That is, the bit value of the data word x at bit position 0 is to be evaluated for the first two loop iterations, leading to the bit sequence "01". Furthermore, the number of loop iterations is 50, as derivable by the loop information of the "for" statement. Therefore, the repetitive bit value pattern has to be repeated 25 times in order to fully describe the bit value pattern at bit position "0" generated by the for-loop of the MTL program.

However, in terms of the LST visualization, five consecutive "repeat 2" statements are necessitated, which actually correspond to a repetition of 32 times. In the resulting repeat language representation, this has to be considered in that only four "repeat 2" statements are nested, whereas the remaining repetitions are appended to the four nested "repeat 2" statements, as indicated above.

The following example uses the previously-discussed for-loop as an outer loop, whereas the loop of the first example, having a step size of three, is used as an inner loop in order to illustrate the complete processing of nested for-loops. Again, bit number 0 shall be of interest. The example is as follows:

```
main( )
{
    for(x=0; x < 50; x++)
    {
        for(y=0; y < 64; y+=3)
        {
            access(x + y);
        }
    }
}
Corresponding Syntax Tree:
for (x=0;x<50;x+=1){
    for (y=0;y<64;y+=3){
        (x+y)[0]
    }
}
```

As previously discussed, the outer loop necessitates a repetition of two evaluations of the inner loop for 25 times, as indicated by the following representation:

```
repeat 25 {
    for (y=0; y<64; y+=3)
        {access (0+y)[0];}
    for (y=0; y<64; y+=3)
        {access (1+y)[0]}
}
```

With the same considerations, the inner for-loops (having 22 iterations) also have to be evaluated only twice, each evaluation being based on the correct value of the outer-loop variable x. This leads to the following representation of the bit sequence at bit position 0 resulting from the MTL program:

```
repeat 25 {
    repeat 11
        {01}
    repeat 11
        {10}
}
```

Given the above example, it is evident as to how a repetitive bit value pattern associated with a predetermined bit position of a sequence of data words (the data word used by the access-statement), the data word comprising two or more bits in a bit order, a bit position describing a position within the bit order and being indicative of a value represented by the bit at the bit position (the weight of the bit in the respective representation of numbers) can be determined without the necessity to derive the full sequence of data words.

Further considering the constraints of the syntax elements for an LST representation, the LST representation could be derived as follows:

Please note that the first optimization of the respective syntax is based on a slightly enhanced set of syntax elements allowing for an even number of repetitions within one statement, such that the syntax may be significantly shortened.

The following example furthermore comprises numerous statements altering the respective data word within the inner loop. As the processing follows straight-forward from the previously-described principles, a further explanation of the following statement will be omitted.

```
main( )
{
    for(x=50; x > 0; x-=9)
    {
        for(y=0; y < 64; y+=3)
        {
            access(x + y);
            access(0);
            access(x * x);
            access(~y);
        }
    }
}
Corresponding Syntax Tree:
for (x=50;x>0;x-=9){
    for (y=0;y<64;y+=3){
        (x+y)[0];
        0;
        (x*x)[0];
        (~y)[0];
```

}
}
Corresponding Loop Split-up Tree for bit '0' (LST):
$2x(2x((End_{Left},End_{Right})))$
Corresponding Repeat-Loop:
```
repeat 2 {
    for (y=0;y<64;y+=3){
        (50+y)[0];
        0;
        0;
        (~y)[0];
    }
    for (y=0;y<64;y+=3){
        (41+y)[0];
        0;
        1;
        (~y)[0];
    }
}
for (y=0;y<64;y+=3){
    (14+y)[0];
    0;
    0;
    (~y)[0];
}
for (y=0;y<64;y+=3){
    (5+y)[0];
    0;
    1;
    (~y)[0];
}
```
Corresponding Loop Split-up Tree for bit '0' (LST):
$2x(2x(2x(2x((End_{Left},End_{Right})))))$
Corresponding Repeat-Loop:
```
repeat 2 {
    repeat 2 {
        repeat 2 {
            repeat 2 {
                00011000
            }
        }
    }
    repeat 2 {
        00011000
    }
    00011000
    for (y=0;y<64;y+=3){
        (41+y)[0];
        0;
        1;
        (~y)[0];
    }
}
for (y=0;y<64;y+=3){
    (14+y)[0];
    0;
    0;
    (~y)[0];
}
for (y=0;y<64;y+=3){
    (5+y)[0];
    0;
    1;
    (~y)[0];
}
```
Corresponding Loop Split-up Tree for bit '0' (LST):
$2x(2x(2x(2x((End_{Left},End_{Right})))))$
Corresponding Repeat-Loop:
```
repeat 2 {
    repeat 2 {
        repeat 2 {
            repeat 2 {
                00011000
            }
        }
    }
    repeat 2 {
        00011000
    }
    00011000
```

```
repeat 2 {
  repeat 2 {
    repeat 2 {
      10110010
    }
  }
}
repeat 2 {
  10110010
}
10110010
}
for (y=0;y<64;y+=3){
  (14+y)[0];
  0;
  0;
  (~y)[0];
}
for (y=0;y<64;y+=3){
  (5+y)[0];
  0;
  1;
  (~y)[0];
}
```
Corresponding Loop Split-up Tree for bit '0' (LST):
$2x(2x(2x(2x((End_{Left},End_{Right})))))$
Corresponding Repeat-Loop:
```
repeat 2 {
  repeat 2 {
    repeat 2 {
      repeat 2 {
        00011000
      }
    }
  }
  repeat 2 {
    00011000
  }
  00011000
  repeat 2 {
    repeat 2 {
      repeat 2 {
        10110010
      }
    }
  }
  repeat 2 {
    10110010
  }
  10110010
}
repeat 2 {
  repeat 2 {
    repeat 2 {
      00011000
    }
  }
}
repeat 2 {
  00011000
}
00011000
for (y=0;y<64;y+=3){
  (5+y)[0];
  0;
  1;
  (~y)[0];
}
```
Corresponding Loop Split-up Tree for bit '0' (LST):
$2x(2x(2x(2x((End_{Left},End_{Right})))))$
Corresponding Repeat-Loop:
```
repeat 2 {
  repeat 2 {
    repeat 2 {
      repeat 2 {
        00011000
      }
    }
  }
  repeat 2 {
    00011000
  }
  00011000
  repeat 2 {
    repeat 2 {
      repeat 2 {
        10110010
      }
    }
  }
  repeat 2 {
    10110010
  }
  10110010
}
repeat 2 {
  repeat 2 {
    repeat 2 {
      00011000
    }
  }
}
repeat 2 {
  00011000
}
00011000
repeat 2 {
  repeat 2 {
    repeat 2 {
      10110010
    }
  }
}
repeat 2 {
  10110010
}
10110010
```
1st Optimization after converting all for-loops to Repeat-Loops:
```
repeat 2 {
  repeat 10 {
    00011000
  }
  00011000
  repeat 10 {
    10110010
  }
  10110010
}
repeat 10 {
  00011000
}
00011000
repeat 10 {
  10110010
}
10110010
```

Although the previous examples were discussed as if they were implemented in pure software, it is, of course, also possible to implement the inventive concept in hardware, as illustrated by FIG. 7.

FIG. 7 shows a bit value pattern analyzer 200 adapted to determine a repetitive bit value pattern associated with a predetermined bit position of a sequence of data words, the data words comprising two or more bits in a bit order, the bit position describing a position within the bit order being indicative of a value represented by the bit at the bit position based on program-loop information 202, the program-loop information 202 comprising a program expression for determining an updated data word of the sequence of data words. The bit value pattern analyzer 200 comprises a sequence estimator 204, an expression evaluator 206 and a bit value pattern generator 208.

The sequence estimator 204 is adapted to determine, using the predetermined bit position, a sequence length value 210 associated to the predetermined bit position.

The expression evaluator is adapted to evaluate the program expression 212 for a number of loop iterations indicated by the sequence length value 210 in order to obtain updated bit values associated to the predetermined bit position.

The bit value pattern generator 208 is adapted to use the updated bit values of the number of loop iterations to determine the repetitive bit value pattern, which could, for example, be output at an optional output 220 of the bit value pattern analyzer.

The previous embodiments describe the application of the inventive concept to high-level program language expressions operating on numerical values in data words in order to determine a repetitive bit value pattern for a bit within the data word. However, the inventive concept is not restricted to such an application. It may be furthermore used to determine repetitive bit value patterns for bit positions caused altered by other expressions. For example, repetitive bit value patterns caused by words or sentences of text-processing systems may also be derived.

To this end, other prerequisites than the prerequisites for the numerical expressions previously introduced may be fulfilled in order to be able to determine a sequence length value indicating the maximum possible repetitive bit sequence length. The rule as to how to derive the respective sequence length value have to be adapted to the specific implementation scenario, which is straight-forward for the man skilled in the art knowing the teaching of this application.

Furthermore, heuristics may be introduced to generally decide as to whether an expression within a loop-statement or another statement may be described using repetitive bit sequences (repetitive bit value pasterns). If a case not allowing the derivation of a repetitive bit sequence is detected, an appropriate translator could evaluate the expression for each loop iteration, such that also most complex expressions within loop iterations may also be evaluated. Thus, a lot of flexibility for address-stepping sequences and data sequences, which may be quite complex to implement in traditional shared resource architecture, can be provided.

In the previously-discussed examples, the number of loop iterations to be performed have been multiple of the sequence length value in order to simplify the explanation. It goes without saying that the inventive concept may also be applied to loops not fulfilling this constraint. It is again to be emphasized that the inventive concept may not only beneficially be used in memory testing. Furthermore, it may be applied to other digital data processing or diagnostic applications, such as, for example, to determine a bit sequence while debugging program code, determining the bit sequence generated by further high-level program languages, such as, for example, C, C++ and others.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Method for determining a repetitive bit value pattern associated to a predetermined bit position of a sequence of data words, the data words comprising two or more bits in a bit order, a bit position describing a position within the bit order being indicative of a value represented by the bit at the bit position, based on a program loop information, the program loop information comprising a program expression for determining an updated data word of the sequence of data words, and iteration information derived from the program loop information, the iteration information indicating a number of loop iterations to be performed for generating the sequence of data words, comprising:

determining, using the predetermined bit position, a sequence length value associated to the predetermined bit position based on a polynomial expression without performing all loop iterations;

after determining the sequence length value, evaluating the program expression only for the number of loop iterations indicated by the sequence length value, to acquire updated bit values associated to the predetermined bit position; and using the updated bit values of the number of loop iterations to determine the repetitive bit value pattern.

2. Method according to claim 1, in which the sequence length value indicates the number of different values that can be represented by the data word and which are smaller than the value represented by the bit at the bit position.

3. Method according to claim 1, in which the data word is a binary expression of a numerical value, such that the bit value x of a hit at bit position it represents the numerical value $x*2^n$.

4. Method according to claim 3, in which the sequence length value 1 is determined such that it can be described by the following expression:

$$1=2^{n+1}.$$

5. Method according to claim 1, in which the repetitive bit value pattern is determined concatenating the updated bit values of each loop iteration.

6. Method according to claim 1, further comprising:

evaluating a second program expression comprised in the program loop information for the number of loop iterations indicated by the sequence length value to acquire second updated bit values associated to the predetermined bit position; and further using the second updated bit values to determine the repetitive bit value pattern.

7. Method according to claim 6, in which the repetitive bit value pattern is derived by concatenating the pairs of the first updated bit value and the second updated bit value generated in an identical loop iteration.

8. A method according to claim 1, in which evaluating the program expression comprises:

deriving an updated data word of the sequence of data words; and extracting the bit value of the bit of the data word located at the predetermined position.

9. Method according to claim 1, further comprising:
deriving a repetition value associated to the repetitive bit value pattern using the sequence length value and the iteration information.

10. Method according to claim 9, in which the repetition value is derived by dividing the number of loop iterations indicated by the iteration information by the sequence length value.

11. Method according to claim 9, further comprising:
generating a repetition representation of the bit value pattern associated to the predetermined bit position of the sequence of data words, the repetition representation using the repetition value and the repetitive bit value pattern such, that the repetition representation indicates the number of times the repetitive bit value pattern is to be repeated to generate the bit value pattern of the predetermined bit position of the sequence of data words.

12. Method according to claim 9, further comprising:
transforming the repetition representation into a repeat language representation by transforming the number of repetitions indicated by the repetition value to nested repeat statements, each repeat statement indicating, a single repetition of an expression referenced by the repeat statement.

13. Method according to claim 1, in which the data word is used to access a memory.

14. Method according to claim 13, in which the data word is associated to a row- or to a column-address of a data element to be accessed.

15. Method according to claim 1, in which the sequence length value is smaller than the number of loop iterations indicated by the iteration information.

16. A computer running a computer program product with a program code, stored on a machine readable non-transistor carrier of the computer, to perform a bit value pattern analyzer adapted to determine a repetitive bit value pattern associated to a predetermined bit position of a sequence of data words, the data words comprising two or more bits in a bit order, the bit position describing a position within the bit order being indicative of a value represented by the bit at the bit position, based on a program loop information, the program loop information comprising a program expression for determining an updated data word of the sequence of data words, and iteration information derived from the program loop information, the iteration information indicating a number of loop iterations to be performed for generating the sequence of data words, comprising:
a sequence estimator, adapted to determine, using, the predetermined bit position, a sequence length value associated to the predetermined bit position based on a polynomial expression without performing all loop iterations;
an expression evaluator adapted to evaluate the program expression for only the number of loop iterations indicated by the previously determined sequence length value, to acquire updated bit values associated to the predetermined bit position; and
a bit value pattern generator adapted to use the updated bit values of the number of loop iterations to determine the repetitive bit value pattern.

17. One or more computing device readable media storing a computer program adapted to, when running on a computer, implement a method for determining a repetitive bit value pattern associated to a predetermined bit position of a sequence of data words, the data words comprising two or more bits in a bit order, a bit position describing a position within the bit order being indicative of a value represented by the bit at the bit position, based on a program loop information, the program loop information comprising a program expression for determining an updated data word of the sequence of data words, and iteration information derived from the program loop information, the iteration information indicating a number of loop iterations to be performed for generating the sequence of data words, the method comprising:
determining, using the predetermined bit position, a sequence length value associated to the predetermined bit position based on a polynomial expression without performing all loop iterations;
after determining the sequence length value, evaluating the program expression only for the number of loop iterations indicated by the sequence length value, to acquire updated bit values associated to the predetermined bit position; and
using the updated hit values of the number of loop iterations to determine the repetitive bit value pattern.

18. Test system for testing devices comprising two or more data terminals configured to receive a sequence of data words, the data words comprising two or more bits in a bit order, a bit position describing a position within the bit order being indicative of a value represented by the bit at the bit position, the test system comprising a first and a second data pin configured to be coupled to the first and second data terminals of the device, the test system comprising:
a bit value pattern analyzer adapted to determine a repetitive bit value pattern associated to a predetermined data pin, based on a program loop information, the program loop information comprising a program expression for determining an updated data word of the sequence of data words, and iteration information derived from the program loop information, the iteration information indicating a number of loop iterations to be performed for generating the sequence of data words, the bit value pattern analyzer comprising:
a sequence estimator, adapted to determine, using the predetermined bit position associated to the predetermined data pin, a sequence length value associated to the predetermined data pin based on a polynomial expression without performing all loop iterations;
an expression evaluator adapted to evaluate the program expression for only the number of loop iterations indicated by the previously determined sequence length value, to acquire updated bit values associated to the predetermined data pin; and
a bit value pattern generator for generating the repetitive bit value pattern for the predetermined data pin using the updated bit values of the number of loop iterations.

19. Test system according to claim 18, which is adapted to test memory-devices.

20. Test system according to claim 19, in which the predetermined data pin is configured to be coupled to an address terminal of a memory device.

* * * * *